United States Patent
Dong

(10) Patent No.: US 12,155,466 B2
(45) Date of Patent: Nov. 26, 2024

(54) DATA TRANSMISSION METHOD AND APPARATUS, AND COMMUNICATION DEVICE AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 137 days.

(21) Appl. No.: 17/996,466

(22) PCT Filed: Apr. 29, 2020

(86) PCT No.: PCT/CN2020/087743
§ 371 (c)(1),
(2) Date: Oct. 18, 2022

(87) PCT Pub. No.: WO2021/217486
PCT Pub. Date: Nov. 4, 2021

(65) Prior Publication Data
US 2023/0224069 A1    Jul. 13, 2023

(51) Int. Cl.
*H04L 1/1607* (2023.01)
*H04L 1/00* (2006.01)

(52) U.S. Cl.
CPC .......... *H04L 1/0007* (2013.01); *H04L 1/0026* (2013.01); *H04L 1/1642* (2013.01)

(58) Field of Classification Search
CPC ....... H04L 1/08; H04L 1/1614; H04L 1/1621; H04L 1/1642; H04L 1/1685; H04W 8/24; H04W 76/15

USPC ..................... 370/328, 329, 401
See application file for complete search history.

(56) References Cited

U.S. PATENT DOCUMENTS

| | | | |
|---|---|---|---|
| 2005/0238054 A1* | 10/2005 | Sharma ................ | H04L 1/1642 370/473 |
| 2015/0089237 A1 | 3/2015 | Kim et al. | |
| 2019/0082373 A1 | 3/2019 | Patil et al. | |
| 2019/0150214 A1* | 5/2019 | Zhou ..................... | H04W 76/15 370/329 |
| 2019/0364555 A1 | 11/2019 | Huang et al. | |
| 2021/0211235 A1* | 7/2021 | Chu ...................... | H04L 1/1614 |

(Continued)

FOREIGN PATENT DOCUMENTS

| CN | 103109496 A | 5/2013 |
|---|---|---|
| WO | WO 0042743 A2 | 7/2000 |

(Continued)

OTHER PUBLICATIONS

WO_2020238812_Machine Translation (Year: 2020).*
(Continued)

*Primary Examiner* — Harun Chowdhury
(74) *Attorney, Agent, or Firm* — Finnegan, Henderson, Farabow, Garrett & Dunner, L.L.P

(57) ABSTRACT

A method for data transmission is performed by a first device, and includes: determining a first sequence control field for a first category of data frame, wherein the first sequence control field has a bit length configured to enable the first sequence control field to support multi-link communication; and sending the first category of data frame carrying the first sequence control field.

17 Claims, 3 Drawing Sheets

(56) References Cited

U.S. PATENT DOCUMENTS

2022/0368481 A1* 11/2022 Yang .................... H04L 1/1642

FOREIGN PATENT DOCUMENTS

| WO | WO 2015164998 A1 | 11/2015 | |
|----|------|------|------|
| WO | WO-2020238812 A1 * | 12/2020 | ........... H04L 1/1614 |

OTHER PUBLICATIONS

European Patent Office, Extended European Search Report issued in Application No. 20933799.7 dated Dec. 5, 2023, 10 pages.
The First Office Action for Chinese Patent Application No. 202080000864.7, dated Apr. 25, 2023, 9 pages.
LAN/MAN Standards Committee of the IEEE Computer Society, "Part 11: Wireless LAN Medium Access Control (MAC) and Physical Layer (PHY) Specifications", IEEE P802.11-REVmd™/D0.0, May 2017, 3532 pages.
International Search Report and Written Opinion of International Application No. PCT/CN2020/087743, mailed Jan. 28, 2021.
Notice of Reasons for Refusal for Japanese Patent Application No. 2022-565718, issued Jun. 27, 2023, 6 pages.

* cited by examiner

DATA TRANSMISSION METHOD AND APPARATUS, AND COMMUNICATION DEVICE AND STORAGE MEDIUM

CROSS-REFERENCE TO RELATED APPLICATION

This application is the U.S. national phase application of International Application No. PCT/CN2020/087743, filed on Apr. 29, 2020, the entire disclosure of which is incorporated herein by reference.

TECHNICAL FIELD

The disclosure relates to, but is not limited to, the field of wireless communication technologies and in particular, to a method and an apparatus for data transmission, a communication device and a storage medium.

BACKGROUND

The Institute of Electrical and Electronics Engineers has established a study group (SG) to study the next generation mainstream Wi-Fi technology. The research scope includes: Wi-Fi transmission with a 320 MHz bandwidth, multi-frequency band aggregation and collaboration technology, etc. The proposed vision is to improve the speed and throughput by at least four times compared with the existing IEEE802.11ax. The main application scenarios of the new technology include video transmission, augmented reality (AR), virtual reality (VR), etc. The multi-frequency band aggregation and collaboration technology refers to the simultaneous communication between Wi Fi devices in different frequency bands such as 2.4 GHz, 5.8 GHz and 6-7 GHz, or the communication between Wi Fi devices in different bandwidth under the same frequency band.

In order to ensure the quality of service (QoS) of a data frame, the Wi-Fi technology introduces a sequence number (SN) to uniquely characterize each data frame.

SUMMARY

According to a first aspect of the disclosure, a method for data transmission is provided, which is performed by a first communication terminal. The method includes: determining a first sequence control field for a first category of data frame, in which the first sequence control field has a first bit length, and the first bit length is configured to enable the first sequence control field to support multi-link communication; and sending the first category of data frame carrying the first sequence control field.

According to a second aspect of the disclosure, a communication device is provided, including a processor, a memory for storing programs executable by the processor. When the programs are executed by the processor, the programs cause the processor to perform: determining a first sequence control field for a first category of data frame, in which the first sequence control field has a first bit length, and the first bit length is configured to enable the first sequence control field to support multi-link communication; and sending the first category of data frame carrying the first sequence control field.

According to a third aspect of the disclosure, a non-transitory computer-readable storage medium is provided, on which programs are stored, wherein when the programs are executed by a processor, a method for data transmission of a first device is implemented. The method includes: determining a first sequence control field for a first category of data frame, in which the first sequence control field has a first bit length, and the first bit length is configured to enable the first sequence control field to support multi-link communication; and sending the first category of data frame carrying the first sequence control field.

It should be understood that, the above general description and the following detailed description are exemplary and explanatory, which cannot limit the embodiments of the disclosure.

BRIEF DESCRIPTION OF THE DRAWINGS

The accompanying drawings, which are incorporated in and constitute a part of this specification, illustrate embodiments consistent with the invention and together with the description serve to explain the principles of the embodiments of the invention.

DETAILED DESCRIPTION

The embodiments may be described in detail herein, examples of which are illustrated in the accompanying drawings. The same numerals in different drawings refer to the same or similar elements unless otherwise indicated, when the following description refers to the drawings. The implementations described in the following embodiments do not represent all implementations consistent with the embodiments of the invention. Rather, they are examples of apparatus and methods consistent with some aspects of embodiments of the invention as recited in the appended claims.

The terms used in the embodiments of the disclosure are for the purpose of describing particular embodiments, and are not intended to limit the embodiments of the disclosure. As used in the embodiments of the disclosure and the appended claims, the singular forms "a", "an," and "the" are intended to include the plural forms as well, unless the context clearly dictates otherwise. It may also be understood that the term "and/or" as used herein refers to and includes any and all possible combinations of one or more of the associated listed items.

It should be understood that although the terms first, second, third, etc. may be used in embodiments of the disclosure to describe various pieces of information, such information should not be limited to these terms. These terms are used to distinguish the same category of information from each other. For example, without departing from the scope of the embodiments of the disclosure, the first information may also be referred to as the second information, and similarly, the second information may also be referred to as the first information. Depending on the context, the words "if" and "in case" as used herein may be interpreted as "at the time of . . . " or "when . . . " or "in response to determining . . . ".

The execution subject involved in the embodiments of the disclosure are include but are not limited to: wireless communication networks, especially network devices such as under the IEEE802.11a/b/g/n/ac standard in Wi-Fi networks, and network devices under the IEEE802.11be standard in the next-generation Wi-Fi networks. The network devices include but are not limited to: wireless access point (AP) devices such as Wi-Fi routers, wireless stations (STAs), user terminals, user nodes, mobile terminals or tablet computers, etc.

An application scenario in the embodiments of the disclosure is that, in the related art, a sequence number (SN) is introduced to ensure the quality of service (QoS) of a data frame. That is, one SN is allocated to each data frame, e.g., media access control service data unit (MSDU), aggregation-media access control service data unit (A-MSDU), or media access control management protocol data unit (MMPDU).

Figure 1:
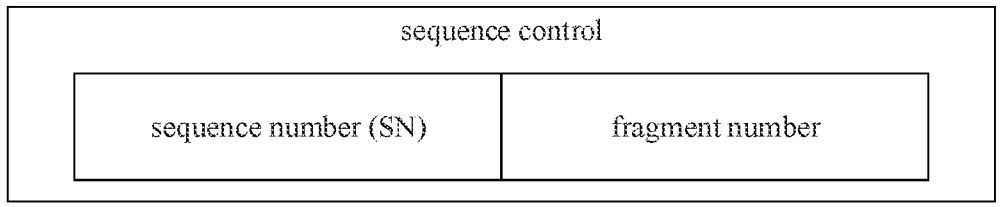
FIG. 1 illustrates a schematic diagram of a sequence control field structure according to an example.

As shown in FIG. 1, a sequence control field is set in a data frame, and the bit length of the sequence control field is 16. The sequence control field includes a sequence number field and a fragment number field. The sequence number field occupies 12 bits, and the fragment number field occupies 4 bits. The sequence number field may be used to set the sequence number of the data frame, etc. In general, a data packet is divided into multiple data fragments during transmission, and the fragment number field is used to indicate a data fragment to which a data frame belongs.

Figure 2:
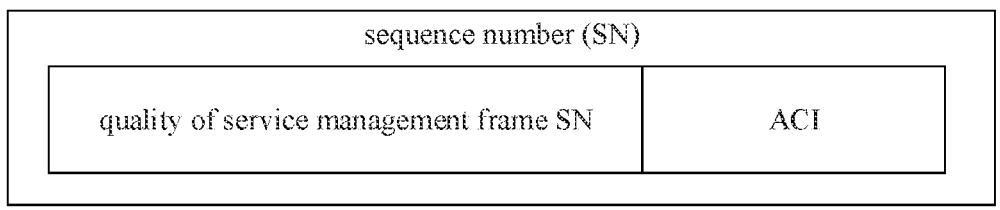
FIG. 2 is a schematic diagram of a sequence number field structure according to an example.

As shown in FIG. 2, the sequence number field includes a sequence number field of a quality management frame (QMF) and an access category index (ACI) field. The QMF sequence number field is used to set the data frame SN. The ACI is used to indicate the access category of the data frame. The different access categories of data frames have different channel access priorities. There are four access categories of data frames, such as: AC_BE (Best Effort), AC_BK (Background), AC_VI (Video) and AC_VO (Voice).

In the related art, the bit length of the QMF sequence number field is 10, and the bit length of the fragment number field is 4, which may satisfy identification of the data frame under a single-link.

For multi-link communication, the number of data frames exceeds the range that may be identified by the QMF sequence number field and the fragment number field.

Figure 3:
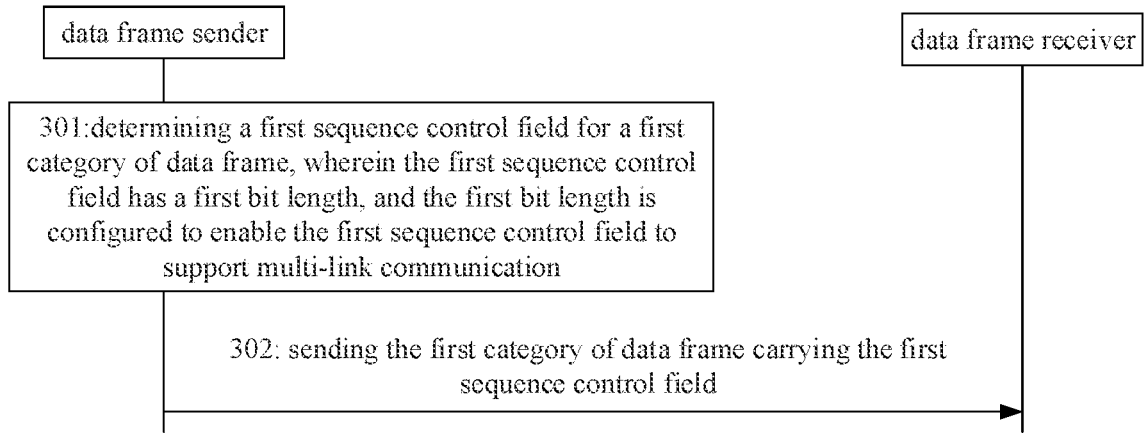
FIG. 3 is a schematic flowchart of a method for data transmission according to an example.

As shown in FIG. 3, a method for data transmission is provided according to an example. The method for data transmission may be applied to a first communication terminal in wireless communication. The method includes the following steps at 301-302.

At 301, a first sequence control field for a first category of data frame is determined. The first sequence control field has a first bit length, and the first bit length is configured to enable the first sequence control field to support multi-link communication.

At 302, sending the first category of data frame carrying the first sequence control field.

Here, the first category of data frame may be sent by an AP or a STA in a Wi-Fi communication system.

The first category of data frame may include, but is not limited to, a data frame in multi-link communication. For example, the first category of data frame may be a data frame conforming to the IEEE802.11be standard in the next-generation Wi-Fi network. Compared with the first category of data frame, a second category of data frame may be a data frame suitable for single-link transmission in the related art. For example, the first category of data frame may be a data frame conforming to the IEEE802.11ax standard. The data frame may be the MSDU, the A-MSDU, or the MMPDU.

The first sequence control field is configured to uniquely identify a data frame, and filter duplicate data frames when the AP or STA performs transmission that meets the QoS.

The first sequence control field may include a QMF SN field, an ACI field, a fragment number field, and the like. In view of features such as high transmission speed and large amount of data transmission in the multi-transmission communication, the first bit length may be determined based on a data packet fragment to be identified in the multi-transmission communication, and a number of first category of data frames to be identified. By changing the first bit length of the first sequence control field in the first category of data frame, the first sequence control field may be enabled to support the multi-link communication. Here, the fact that the first sequence control field may support the multi-link communication may refer to that the first sequence control field may be used for both single-link communication and multi-link communication.

Here, in order to meet the needs of multi-link transmission, a number of different identification information, which may be represented by the first sequence control field with the first bit length, may be greater than or equal to a number of data frames transmitted by at least two links (connections). The number of different QMF SNs, which may be represented by the bit length of the QMF SN field in the first sequence control field, may be greater than or equal to the number of data frames transmitted by at least two links, and/or the quantity of different fragment numbers, which may be represented by the bit length of the fragment number field in the first sequence control field, may be greater than or equal to the quantity of different fragments to which the data frames transmitted by at least two links belong. In this way, the first sequence control field may meet the quantity needs for the data frames transmitted simultaneously by at least two links.

In an example, a bit length of a QMF SN field of a second sequence control field in the related art is 10, which may represent QMF SNs of 1024 data frames, and the 1024 QMF SNs may identify the data frames transmitted by one link, thus meeting the needs for data frame transmission on one link. The bit length of the QMF SN field of the first sequence control field may be set to 11, so that the QMF SN field of the first sequence control field may represent QMF SNs of 2048 data frames, and the 2048 QMF SNs may identify the data frames simultaneously transmitted by two links, thus meeting the needs for data frame transmission on the two links.

In this way, by setting the first bit length, the first sequence control field may identify more data frames, so that the first sequence control field may meet the needs of multi-link communication. Then, the AP and STA may perform data frame transmission based on QoS with the multi-link, thus improving the transmission speed and improving the network data throughput.

In an embodiment, the first sequence control field includes a first SN field, and the first SN field includes at least a first QMF SN field indicating a SN of the first category of data frame.

Here, as shown in FIG. 1, the first sequence control field includes a first SN field. As shown in FIG. 2, the first SN field includes the first QMF SN field. The first QMF SN field is used to set the SN of the first data frame. The SN of the first data frame may uniquely identify the first data frame.

The bit length of the first QMF SN field may be determined based on a maximum number of first category of data frames that are possible in the multi-transmission communication.

In an embodiment, the first sequence control field includes a first fragment number field, and the first fragment number field indicates a fragment number of the first category of data frame.

Here, the first fragment number field is used to set the fragment number of the first data frame. The SN of the first data frame may uniquely identify the fragment to which the first data frame belongs.

In general, a data packet is divided into multiple fragments during transmission, and the fragment number field is used to indicate the fragment to which the data frame belongs.

The bit length of the first fragment number field may be determined based on a number of fragments that are possible in the multi-transmission communication.

In an embodiment, the bit length of the first sequence control field is a fixed value.

The bit length of the first sequence control field may be the fixed value, that is, the bit length of the first sequence control field is not varied with a transmission environment (e.g., the number of transmission links).

The bit length of the SN field in the first sequence control field, the bit length of the fragment number field, and the bit length of the QMF SN field in the SN field may all be fixed values.

In an example, the first sequence control field may be 18 bits, where the QMF SN field may be 14 bits (increased by two bits compared to the related art). In this way, the number of QMF SNs that may be set in the QMF SN field is 4 times than the original number of QMF SNs.

The bit length of the first sequence control field adopts a fixed value, which may reduce the complexity of dynamically adjusting the bit length of the first sequence control field and reduce the development difficulty.

In an embodiment, the bit length of the first sequence control field is greater than the bit length of the second sequence control field in the second category of data frame. The category for the first category of data frame is different from that for the second category of data frame, and the bit length of the second sequence control field is configured to support single-link communication.

The second sequence control field may be a sequence control field for the second category of data frame under the IEEE802.1 lax standard. The bit length of the second sequence control field may be 16.

In the multi-link communication, multiple transmission links are established between the AP and the STA. For example, the AP is connected to 3 STAs and 3 transmission links are established between each STA and the AP. In this way, 9 transmission links are established between the AP and the 3 STAs at the same time. The amount of data transmitted by 9 transmission links is greatly increased, that is, the number of data frames is greatly increased. As such, the number of QMF SNs supported by the QMF SN field in the sequence control field, and/or the number of fragment numbers supported by the fragment number field cannot meet the needs for uniquely identifying each data frame.

Therefore, it is possible to enable that the bit length of the first sequence control field in the first category of data frame is greater than the bit length of the second sequence control field in the second category of data frame, so that the number of QMF SNs that may be supported by the first sequence control field in the first category of data frame, and/or the number of fragment numbers may meet the needs for the amount of data frames in the multi-link communication.

In an example, the bit length of the first sequence control field in the first category of data frame may be increased by two bits compared to the bit length of the second sequence control field in the second category of data frame. That is, the first sequence control field has 18 bits. The increased bit length may be used for the QMF SN field, and/or the fragment number field. For example, one bit increased in the QMF SN field may double the number of QMF SNs that can be set in the QMF SN field. In this way, the transmission needs for more data frames may be met.

In this way, compared with the second sequence control field in the second category of data frame, increasing the bit length of the first sequence control field in the first category of data frame may increase the amount of data frames that can be identified by the first sequence control field, so that the first sequence control field may meet the needs of multi-link communication. Then, the AP and STA may perform data frame transmission based on QoS with the multi-link, thus improving the transmission speed, improving the network data throughput and improving the spectrum utilization.

In an embodiment, the bit length of the first SN field in the first sequence control field is greater than the bit length of the second SN field in the second sequence control field, and/or, the bit length of the first QMF SN field in the first SN field is greater than the bit length of the second QMF SN field in the second SN field.

Here, increasing the bit length of the first SN field compared to the second SN field may increase the bit length of the first QMF SN field in the SN field of the first sequence control field, and/or the bit length of the ACI field in the SN field of the first sequence control field.

Increasing the bit length of the QMF SN field in the SN field of the first sequence control field may thus increase the number of QMF SNs that the first sequence control field can support, so as to meet the needs for increasing the amount of data frames in the multi-link communication.

Increasing the bit length of the ACI field in the SN field of the first sequence control field may thus increase data categories that can be indicated by the ACI field, so as to meet the needs for transmitting more types of data.

In an embodiment, the bit length of the first SN field in the first sequence control field is greater than 12.

For the bit length of the second sequence control field in the second category of data frame in the related art being 12, the bit length of the first SN field in the first sequence control field may be set to be greater than 12. For example, the bit length of the first SN field in the first sequence control field may be set to be 16.

Here, the newly added 4 bits may all be allocated to the first QMF SN field and/or the ACI field in the first sequence control field.

In an embodiment, the bit length of the first QMF SN field in the first SN field of the first sequence control field is greater than 10.

When the bit length of the QMF SN field in the second sequence control field in the second category of data frame is 10 in the related art, the bit length of the first QMF SN field in the SN field of the first sequence control field may be set to be greater than 10.

In an example, the bit length of the first QMF SN field in the first SN field of the first sequence control field may be set to be 14 bits. After the 4 bits are added, the amount of data frames that can be indicated by the QMF SN field is 16 times that in the related art, thus increasing the amount of data frames that can be transmitted by multiple links and improving the network data throughput.

In an embodiment, the bit length of the first fragment number field in the first sequence control field is greater than the bit length of the second fragment number field in the second sequence control field.

Increasing the bit length of the first fragment number field in the first sequence control field may increase the number of fragments that can be indicated by the first fragment number field, so that the multi-transmission link may transmit more data packet fragments and improve the network data throughput.

In an embodiment, the bit length of the first fragment number field in the first sequence control field is greater than 4.

When the bit length of the first fragment number field in the second sequence control field in the second category of data frame is 4 in the related art, the bit length of the first fragment number field in the first sequence control field may be set to be greater than 4.

In an example, the bit length of the first fragment number field in the first sequence control field may be set to be 8. After the 4 bits are added, the number of fragments obtained by dividing the data packet and indicated by the first fragment number field is 16 times that in the related art. In this way, the number of data packet fragments that can be transmitted by multiple links may be increased, and the network data throughput may be improved.

In an embodiment, determining the first sequence control field for the first category of data frame includes: determining the bit length of the first sequence control field based on a link number of the first device.

The bit length of the first sequence control field may be varied with the number of links established between the AP and the STA.

For example, when one link is established between the AP and the STA, the bit length of the first sequence control field is 16, in which the bit length of the SN field in the first sequence control field is 12, and the bit length of the fragment number field in the first sequence control field is 4. When two links are established between the AP and the STA, the bit length of the first sequence control field may be increased by 1 bit. The bit length of the first sequence control field is 17. The added bit may be allocated to the QMF SN field of the SN field in the first sequence control field. In this way, the amount of data frames indicated by the QMF SN field may be increased, thus increasing the amount of data frames that can be transmitted by multiple links and improving the transmission efficiency.

In this way, according to the number of links of the AP, the bit length of the first sequence control field in the first category of data frame is increased. The bit length of the first sequence control field may be flexibly adjusted according to the number of links, so as to meet the needs of multi-link communication, and improve the flexibility of configuring the bit length of the first sequence control field. Then, data frame transmission between the AP and the STA is achieved by multiple links, thus improving the transmission speed and improving the network data throughput.

Further, the link refers to a communication channel for data transmission between the STA and the AP, which may be a link formed by at least two or all channels of the 2.4 GHz, 5 GHz and 6-7 GHz frequency bands, or a link formed by different bandwidths in any frequency band.

In an embodiment, determining the length of bits occupied by the first sequence control field based on the link number of the first device includes: determining a bit length of the first QMF SN field in the first SN field and/or a bit length of the first fragment number field in the first sequence control field based on the link number of the first device.

The greater the number of links, the more the amount of data frames that can be transmitted, and the more fragments of data packets carried in the data frames. Therefore, the bit length of the first QMF SN field in the SN field of the first sequence control field and/or the bit length of the first fragment number field in the first sequence control field may be determined based on a change in the number of links.

For example, when the number of links increases, the bit length of the first QMF SN field in the first SN field of the first sequence control field may be increased. In this way, the number of QMF SNs that can be supported by the first sequence control field may be increased, to meet the needs for increasing the amount of data frames in the multi-link communication.

When the number of links increases, the bit length of the first fragment number field in the first sequence control field may be increased, and the number of fragments that can be indicated by the first fragment number field may be increased, to meet the needs for increasing the number of fragments in the multi-link communication, enable the multi-transmission link to transmit more data packets, and improve the transmission efficiency.

In an embodiment, determining the bit length of the first QMF SN field in the first SN field based on the link number of the first device includes: determining a sum of a bit length occupied by a binary value of the link number of the first device and a first basic value, as the bit length of the first QMF SN field in the first SN field of the first sequence control field.

Here, the first basic value may be a bit length of the second QMF SN field in the related art.

In the related art, the second QMF SN field has 10 bits. When the number of links is doubled, the number of QMF SNs that can be supported by the QMF SN field also needs to be doubled. Therefore, a sum of the bit length occupied by the binary value of the link number of the AP plus 10 may be determined as the bit length of the first QMF SN field.

In an example, in the related art, the bit length of the second QMF SN field is 10, initial associations are established between 3 STAs and the AP, and 3 links are established between each STA and the AP respectively. In this way, the AP communicates in 9 links. The binary value of 9 is 1001, which occupies 4 bits. Therefore, the bit length of the first QMF SN field may be set to be 14 bits.

In an embodiment, determining the bit length of the first fragment number field in the first sequence control field based on the link number of the first device includes: determining a sum of a bit length occupied by a binary value of the link number of the first device and a second basic value, as the bit length of the first fragment number field in the first sequence control field.

Here, the second base value may be a bit length of the fragment number field in the related art.

In the related art, the second fragment number field has 4 bits. When the number of links is doubled, the number of fragments that can be supported by the fragment number field also needs to be doubled. Therefore, a sum of the bit length occupied by the binary value of the link number of the AP plus 4 may be determined as the bit length of the first fragment number field.

In an example, in the related art, the bit length of the second fragment number field is 4, initial associations are established between 3 STAs and the AP, and 3 links are established between each STA and the AP respectively. In this way, the AP communicates in 9 links. The binary value of 9 is 1001, which occupies 4 bits. Therefore, the bit length of the first fragment number field may be set to be 8 bits.

In an embodiment, the link number of the first device includes: a number of links currently established by the first device and/or a maximum number of links supported by the first device.

Here, the AP may establish multiple links with one STA. The AP may establish multiple links with one STA at the same time, and transmit data by multiple links, to improve the data transmission speed and the network data throughput.

The multiple links may include each link and/or a single-link established in the multi-link communication.

The link number of the first device may be multiple links currently established by the AP and/or STA, or may also be the maximum number of links that the AP and/or STA can currently support. The bit length of the first sequence control field is determined based on the number of currently established links and/or the maximum number of links supported, so that the first sequence control field can be used to enable the AP and/or STA to communicate in the currently established links and/or communicate in the maximum number of links.

In an embodiment, the method further includes: determining whether a second device supports the multi-link communication based on indication information carried in a management frame received from the second device.

Here, the second device may be a STA in wireless communication.

During the process of establishing the initial association between the STA and the AP, the management frame may carry the indication information that the STA supports the multi-link communication. The AP may determine whether the STA supports the multi-link communication based on the indication information. When the STA supports the multi-link communication, the AP may establish multiple links with the STA for data transmission, to improve the data transmission speed and the network data throughput. Here, the management frame may include a probe request frame, an association request frame, a re-association request frame, and the like. The number of links established between the AP and the STA may be determined during the data communication process.

A specific example is provided below in conjunction with any of the above-mentioned embodiments.

A. Setting a Sequence Control Field

The bit length of the sequence control field may be set in two ways at Manner 1-2.

Manner 1, the sequence control field is set with a fixed bit length.

The newly defined sequence control field has a length of 24 bits, which is as follows.

As shown in FIG. 1, the fragment number field may be 8 bits, and the SN field may be 16 bits.

As shown in FIG. 2, the SN field may be specifically defined as: the QMFSN field is set to be 14 bits, and the ACI is set to be 2 bits.

Manner 2, the bit length of the sequence control field is set according to a number of links supported by the AP.

A new information element (IE) may be defined to determine the SN field, and the AP may allocate the existing bit-length SN field for use by STAs other than IEEE802.11be. The AP may determine the length of the SN field and the length of the fragment number field according to communication links with all its associated STAs. For example, 3 STAs have established initial associations with AP, and may communicate with AP in 9 links, the bit length of the QMF SN field is defined as 14 bits, and the bit length of the fragment number field is defined as 8 bits.

B. Information Notification of Simultaneous Multi-Link Communication Capability

During the process of establishing an initial association between the STA and the AP, a capability information value that indicates the STA supports the multi-link communication is carried for example in a management frame, such as a probe request frame, an association request frame, a re-association request frame and the like. The specific number of communication links may be determined during the data communication between the AP and the STA. The number of communication links can be used as the basis in Manner 2 above.

Figure 4:
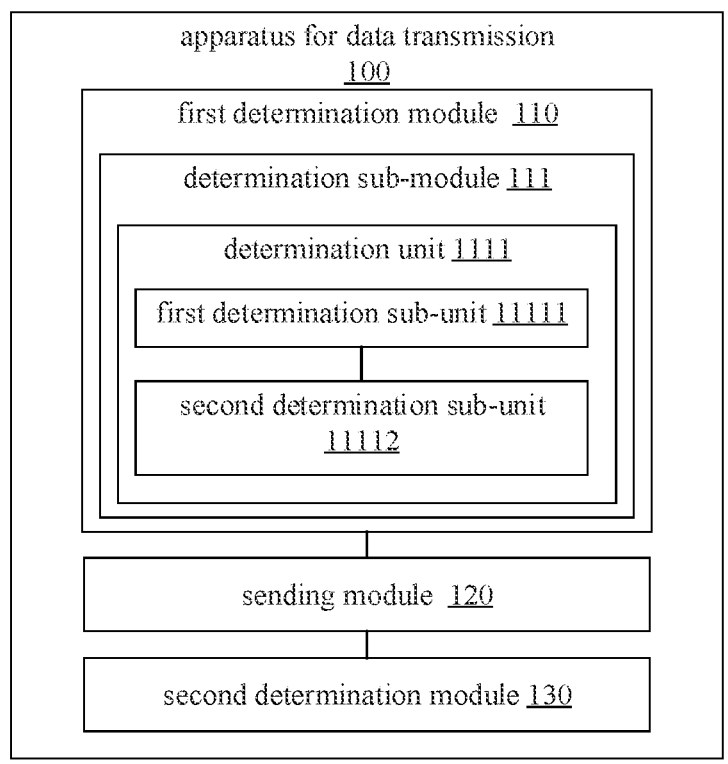
FIG. 4 is a block diagram of an apparatus for data transmission according to an example.

The embodiment of the disclosure further provides an apparatus for data transmission, which is applied to a first communication terminal in wireless communication. As shown in FIG. 4, the apparatus 100 for data transmission includes: a first determination module 110 and a sending module 120.

The first determination module 110 is configured to determine a first sequence control field for a first category of data frame. The first sequence control field has a first bit length, and the first bit length is configured to enable the first sequence control field to support multi-link communication.

The sending module 120 is configured to send the first category of data frame carrying the first sequence control field.

In an embodiment, the first sequence control field includes a first sequence number (SN) field. The first SN field includes at least a first quality management frame (QMF) SN field, and the first QMF SN field indicates a SN of the first category of data frame.

In an embodiment, the first sequence control field includes a first fragment number field, and the first fragment number field indicates a fragment number of the first category of data frame.

In an embodiment, the bit length of the first sequence control field is a fixed value.

In an embodiment, the bit length of the first sequence control field is greater than a bit length of a second sequence control field in a second category of data frame. The category for the first category of data frame is different from that for the second category of data frame, and the bit length of the second sequence control field is configured to support single-link communication.

In an embodiment, a bit length of the first SN field in the first sequence control field is greater than a bit length of a second SN field in the second sequence control field; and/or a bit length of the first QMF SN field in the first SN field is greater than a bit length of a second QMF SN field in the second SN field.

In an embodiment, a bit length of the first SN field in the first sequence control field is greater than 12.

In an embodiment, a bit length of the first QMF SN field in the first SN field of the first sequence control field is greater than 10.

In an embodiment, a bit length of the first fragment number field in the first sequence control field is greater than a bit length of a second fragment number field in the second sequence control field.

In an embodiment, the bit length of the first fragment number field in the first sequence control field is greater than 4.

In an embodiment, the first determination module 110 includes: a determination sub-module 111, configured to determine the bit length of the first sequence control field based on a link number of the first device.

In an embodiment, the determination sub-module 111 includes: a determination unit 1111, configured to determine a bit length of the first QMF SN field in the first SN field and/or a bit length of the first fragment number field in the first sequence control field based on the link number of the first device.

In an embodiment, the determination unit 111 includes: a first determination subunit 11111, configured to determine a sum of a bit length occupied by a binary value of the link number of the first device and a first basic value, as the bit length of the first QMF SN field in the first SN field of the first sequence control field.

In an embodiment, the determination unit 1111 includes: a second determination subunit 11112, configured to determine a sum of a bit length occupied by a binary value of the link number of the first device and a second basic value, as the bit length of the first fragment number field in the first sequence control field.

In an embodiment, the link number of the first device includes: a number of links currently established by the first device and/or a maximum number of links supported by the first device.

In an embodiment, the apparatus 100 further includes: a second determination module 130, configured to determine whether a second device supports the multi-link communication based on indication information carried in a management frame received from the second device.

In an embodiment, the first determination module 110, the sending module 120, the second determination module 130, etc. may be implemented by one or more central processing units (CPU), graphics processing units (GPU), baseband processors (BP), application specific integrated circuits (ASIC), DSPs, programmable logic devices (PLD), complex programmable logic devices (CPLD), field-programmable gate arrays (FPGA), general-purpose processors, controllers, micro controller units (MCU), microprocessors, or other electronic components, to perform the above method.

Figure 5:
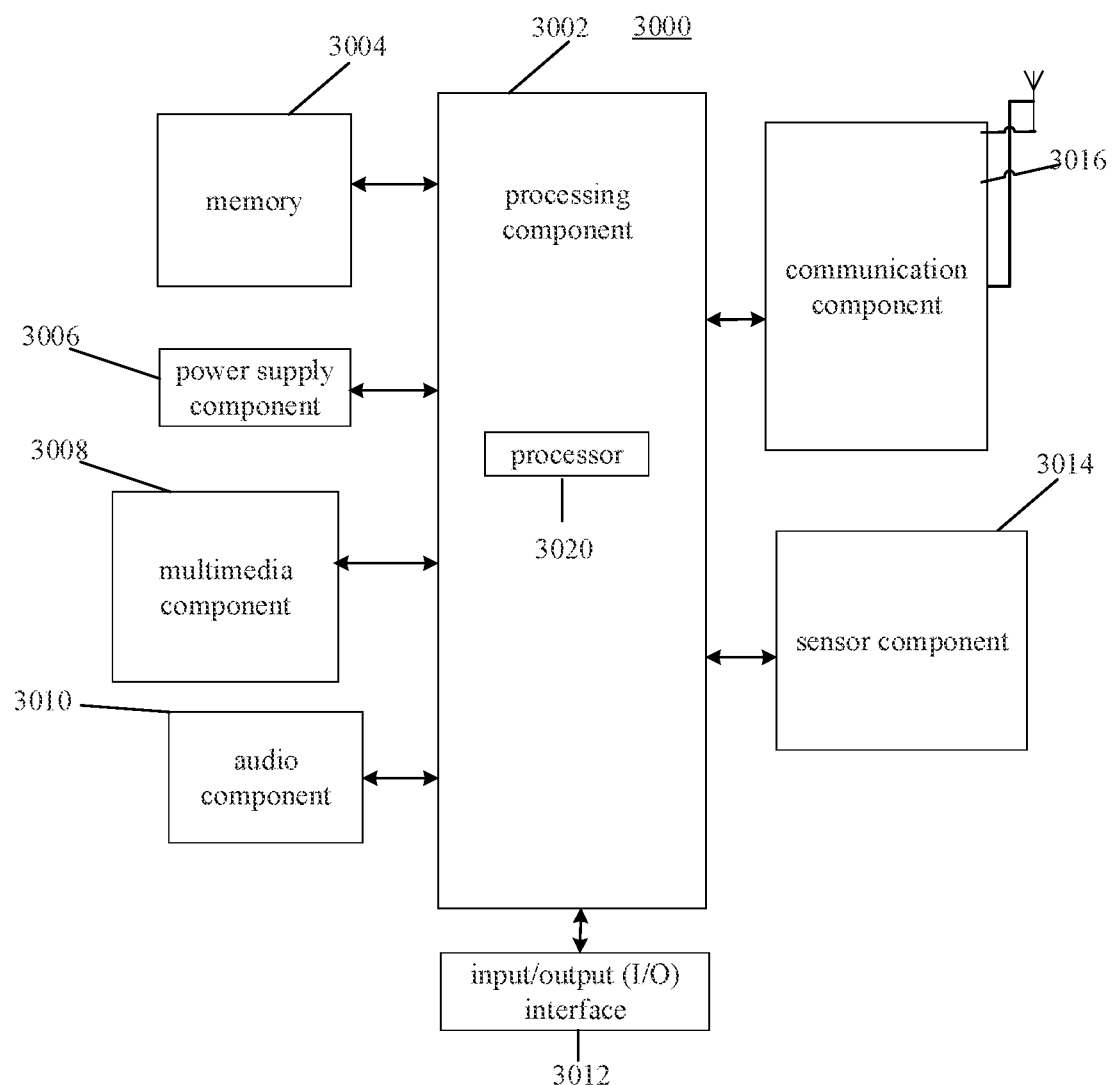
FIG. 5 is a block diagram of a device for data transmission according to an example.

FIG. 5 is a block diagram of a device 3000 for data transmission according to an example. For example, the device 3000 may be a mobile phone, a computer, a digital broadcast terminal, a messaging device, a game console, a tablet device, a medical device, a fitness device, a personal digital assistant, and the like.

Referring to FIG. 5, the device 3000 may include one or more of the following components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls the overall operation of the device 3000, such as operations associated with display, phone calls, data communication, camera operations, and recording operations. The processing component 3002 may include one or more processors 3020 to execute instructions, to perform all or some of the steps in the methods described above. Additionally, the processing component 3002 may include one or more modules that facilitate interactions between the processing component 3002 and other components. For example, the processing component 3002 may include a multimedia module to facilitate interactions between the multimedia component 3008 and the processing component 3002.

The memory 3004 is configured to store various types of data to support operations at the device 3000. Examples of such data include instructions for any application or method operating on the device 3000, contact data, phonebook data, messages, pictures, videos, and the like. The memory 3004 may be implemented by any category of volatile or non-volatile storage devices, or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic or optical disk.

The power supply component 3006 provides power to various components in the device 3000. The power supply components 3006 may include a power management system, one or more power supplies, and other components associated with generating, managing, and distributing power to the 3000.

The multimedia component 3008 includes a screen that provides an output interface between the device 3000 and the user. In some embodiments, the screen may include a liquid crystal display (LCD) and a touch panel (TP). When the screen includes the TP, the screen may be implemented as a touch screen to receive input signals from the user. The touch panel includes one or more touch sensors to sense touch, swipes, and gestures on the TP. The touch sensor may sense not only the boundaries of a touch or swipe action, but also the duration and pressure associated with the touch or swipe action. In some embodiments, the multimedia component 3008 includes a front-facing camera and/or a rear-facing camera. When the device 3000 is in an operation mode, such as a shooting mode or a video mode, the front camera and/or the rear camera may receive external multimedia data. Each of the front and rear cameras may be a fixed optical lens system or have focal length and optical zoom capability.

The audio component 3010 is configured to output and/or input audio signals. For example, audio component 3010 includes a microphone (MIC) that is configured to receive external audio signals when the device 3000 is in an operating mode, such as a call mode, a recording mode, and a voice recognition mode. The received audio signals may be also stored in the memory 3004 or transmitted via the communication component 3016. In some embodiments, the audio component 3010 also includes a speaker for outputting audio signals.

The I/O interface 3012 provides an interface between the processing component 3002 and a peripheral interface module, which may be a keyboard, a click wheel, a button, and the like. These buttons may include, but are not limited to: a home button, a volume button, a start button, and a lock button.

The sensor component 3014 includes one or more sensors for providing state assessment to various aspects of the device 3000. For example, the sensor component 3014 may detect the open/closed state of the device 3000, the relative positioning of the components, such as the display and keypad of the device 3000, the sensor component 3014 may also detect a position change of the device 3000 or a position change of a component of the device 3000, a presence or absence of contacts between the user and the device 3000, an orientation or acceleration/deceleration of the device 3000 and a temperature change of the device 3000. The sensor component 3014 may include a proximity sensor configured to detect the presence of nearby objects in the absence of any physical contact. The sensor component 3014 may also include a light sensor, such as a CMOS or CCD image sensor, for use in imaging applications. In some embodiments, the sensor component 3014 may also include an acceleration sensor, a gyroscope sensor, a magnetic sensor, a pressure sensor, or a temperature sensor.

The communication component 3016 is configured to facilitate wired or wireless communication between the device 3000 and other devices. The device 3000 may access a wireless network based on a communication standard, such as Wi-Fi, 2G or 3G, or their combination. In an example, the communication component 3016 receives broadcast signals or broadcast related information from an external broadcast management system via a broadcast channel. In an example, the communication component 3016 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an example, the device 3000 may be implemented by one or more application specific integrated circuits (ASICs), digital signal processors (DSPs), digital signal processing devices (DSPDs), programmable logic devices (PLDs), field programmable gate arrays (FPGA), controllers, MCUs, microprocessors or other electronic components, to perform the above method.

In an example, there is also provided a non-transitory computer-readable storage medium including instructions, such as the memory 3004 including instructions, which are executable by the processor 3020 in the device 3000 to perform the above method. For example, the non-transitory computer-readable storage medium may be a ROM, a random access memory (RAM), a CD-ROM, a magnetic tape, a floppy disk, an optical data storage device, and the like.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components that are directly or indirectly linked together, so as to perform a particular function.

According to the above embodiments of the disclosure, the first sequence control field for the first category of data frame is determined, where the first sequence control field has a first bit length, and the first bit length is configured to enable the first sequence control field to support multi-link communication, and the first category of data frame carrying the first sequence control field is sent. In this way, by setting the first bit length, the first sequence control field may identify more data frames, so that the first sequence control field may meet the needs of multi-link communication. Then, the AP and the STA may perform data frame transmission based on QoS with multiple links, thus improving the transmission speed and improving the network data throughput.

Those skilled in the art may be readily aware of other implementations of the embodiments of the disclosure, upon consideration of the specification and practice of the invention disclosed herein. The disclosure is intended to cover any variations, uses or adaptations for the embodiments of the invention. These variations, uses or adaptations follow the general principles of the embodiments of the present invention, and include common knowledge or conventional technical means in the art that are not disclosed by the embodiments of the disclosure. The specification and examples are to be regarded as exemplary, and the true scope of embodiments of the invention are indicated by the following claims.

It should be understood that, the embodiments of the invention are not limited to the precise structures described above and illustrated in the accompanying drawings, and various modifications and changes may be made without departing from the scope of the disclosure. The scope of embodiments of the invention is limited only by the appended claims.

The invention claimed is:

1. A method for data transmission, the method being performed by a first device, and comprising:
   determining a first sequence control field for a first category of data frame, wherein the first sequence control field has a bit length configured to enable the first sequence control field to support multi-link communication; and
   sending the first category of data frame carrying the first sequence control field;
   wherein the first sequence control field comprises a first sequence number (SN) field, wherein the first SN field comprises at least a first quality management frame (QMF) SN field, and the first QMF SN field indicates a SN of the first category of data frame; and
   wherein the first sequence control field comprises a first fragment number field, wherein a bit length of the first fragment number field in the first sequence control field is greater than a bit length of a second fragment number field in a second sequence control field, wherein a bit length of the second sequence control field is configured to support only single-link communication.

2. The method of claim 1, wherein the first fragment number field indicates a fragment number of the first category of data frame.

3. The method of claim 2, wherein the bit length of the first sequence control field is a fixed value.

4. The method of claim 3, wherein the bit length of the first sequence control field is greater than a bit length of a second sequence control field in a second category of data frame, wherein the first category of data frame and the second category of data frame are of different categories.

5. The method of claim 4, wherein
   a bit length of the first SN field in the first sequence control field is greater than a bit length of a second SN field in the second sequence control field; and/or
   a bit length of the first QMF SN field in the first SN field is greater than a bit length of a second QMF SN field in the second SN field.

6. The method of claim 3, wherein a bit length of the first SN field in the first sequence control field is greater than 12.

7. The method of claim 6, wherein a bit length of the first QMF SN field in the first SN field of the first sequence control field is greater than 10.

8. The method of claim 1, wherein
   the bit length of the first fragment number field in the first sequence control field is greater than 4.

9. The method of claim 2, wherein determining the first sequence control field for the first category of data frame comprises:
   determining the bit length of the first sequence control field based on a link number of the first device.

10. The method of claim 9, wherein determining the bit length of the first sequence control field based on the link number of the first device comprises:

determining at least one of a bit length of the first QMF SN field in the first SN field or a bit length of the first fragment number field in the first sequence control field, based on the link number of the first device.

11. The method of claim 10, wherein determining the bit length of the first QMF SN field in the first SN field based on the link number of the first device comprises:
determining a sum of a bit length occupied by a binary value of the link number of the first device and a first basic value, as the bit length of the first QMF SN field in the first SN field of the first sequence control field.

12. The method of claim 10, wherein determining the bit length of the first fragment number field in the first sequence control field based on the link number of the first device comprises:
determining a sum of a bit length occupied by a binary value of the link number of the first device and a second basic value, as the bit length of the first fragment number field in the first sequence control field.

13. The method of claim 9, wherein the link number of the first device includes at least one of: a number of links currently established by the first device or a maximum number of links supported by the first device.

14. The method of claim 9, further comprising:
determining whether a second device supports the multi-link communication, based on indication information carried in a management frame received from the second device.

15. A communication device, comprising:
a processor, and
a memory storing programs executable by the processor, wherein the processor is configured to:
determine a first sequence control field for a first category of data frame, wherein the first sequence control field has a bit length configured to enable the first sequence control field to support multi-link communication; and
send the first category of data frame carrying the first sequence control field;
wherein the first sequence control field comprises a first sequence number (SN) field, wherein the first SN field comprises at least a first quality management frame (QMF) SN field, and the first QMF SN field indicates a SN of the first category of data frame; and
wherein the first sequence control field comprises a first fragment number field, wherein a bit length of the first fragment number field in the first sequence control field is greater than a bit length of a second fragment number field in a second sequence control field, wherein a bit length of the second sequence control field is configured to support only single-link communication.

16. The communication device of claim 15, wherein the first fragment number field indicates a fragment number of the first category of data frame.

17. A non-transitory computer-readable storage medium having stored thereon programs that, when executed by a processor, cause the processor to perform:
determining a first sequence control field for a first category of data frame, wherein the first sequence control field has a bit length configured to enable the first sequence control field to support multi-link communication; and
sending the first category of data frame carrying the first sequence control field;
wherein the first sequence control field comprises a first sequence number (SN) field, wherein the first SN field comprises at least a first quality management frame (QMF) SN field, and the first QMF SN field indicates a SN of the first category of data frame; and
wherein the first sequence control field comprises a first fragment number field, wherein a bit length of the first fragment number field in the first sequence control field is greater than a bit length of a second fragment number field in a second sequence control field, wherein a bit length of the second sequence control field is configured to support only single-link communication.

* * * * *